Patented July 29, 1952

2,605,295

UNITED STATES PATENT OFFICE 2,605,295

PROCESS FOR THE PREPARATION OF ACETYLENIC COMPOUNDS

Philip James Garner and Denis Arthur Firth, Thornton-le-Moors, England, assignors to Shell Development Company, San Francisco, Calif., a corporation of Delaware No Drawing. Application October 4, 1948, Serial No. 52,784. In Great Britain October 7, 1947

2 Claims. (Cl. 260—665)

This invention relates to the preparation of alkali metal derivatives of acetylenes.

The present invention has as an object the provision of an improved process for reacting acetylenes with alkali metals to form the corresponding acetylides. Other objects of the invention will be apparent from the nature of the following descripiton.

It is our discovery that the foregoing objects are achieved by conducting the reaction between an alkyne of the type which contains at least three and preferably more than three carbon atoms in the molecule and has a reactive hydrogen atom on a terminal carbon atom forming part of the acetylenic linkage, and an alkali metal in the liquid phase and in the presence of one or more organic compounds which act as hydrogen acceptors for the hydrogen liberated during the reaction, and thereafter reacting the resulting solution with carbon dioxide to form the desired acetylenic acid salt from which the acid is liberated in a known manner. By conducting the reaction in this fashion not only is formation of the alkali metal acetylide facilitated, but a system is established which favors the production in relatively high yield of the desired acetylenic acid on subsequent introduction of carbon dioxide and liberation of acid.

The preferred class of acetylenic reactants comprises alkyne-1 hydrocarbons which, as noted above, contain more than three carbon atoms. However, good results are also obtained with acetylenes which contain other substituents, including aryl and other groups, provided the compound incorporates a terminal carbon atom forming part of the acetylenic linkage and carrying a reactive hydrogen atom. Thus, suitable alkyne-1 reactants are butyne-1, pentyne-1, hexyne-1, heptyne-1, octyne-1, nonyne-1, decyne-1, and, though less preferably, propyne-1, together with the various higher members of the series. Among substituted acetylenic reactants there may be mentioned 6-phenyl hexyne-1, 4-chloro heptyne-1, 3-methyl heptyne-1, 6-methyl heptyne-1, and 7-phenyl heptyne-1.

The hydrogen acceptor compounds referred to above are preferably alkyne hydrocarbons which do not contain a terminal unsaturated linkage, representative materials of this type being alkyne-2 compounds such as butyne-2, pentyne-2, hexyne-2, heptyne-2, etc., alkyne-3 compounds such as hexyne-3, heptyne-3, octyne-3, as well as various alkyne-4, etc. compounds. Such hydrogen acceptor additives as this are particularly desirable for use in the present invention since they are normally produced along with the corresponding alkyne-1 reactants when the latter are manufactured from such inexpensive and readily available raw materials as olefine mixtures obtained during the cracking of various mineral oil and wax fractions. These olefinic mixtures comprise molecules wherein the olefinic linkage is variously disposed so that in some cases a terminal carbon atom is involved, whereas in others the unsaturated linkage is located elsewhere. On working up these mixtures to alkyne products, as, for example, by the method disclosed in co-pending application, Serial No. 776,852, filed September 29, 1947, now U. S. Patent No. 2,542,976 issued February 27, 1951 there are obtained alkyne-1 products mixed with isomers thereof such as alkyne-2 compounds. While heretofore the practice has been to separate these isomers as far as possible before reacting the same with alkali metal and then with carbon dioxide to produce acetylenic acid salts, we have found that it is much more efficient from the standpoint of overall conversion of the alkyne-1 reactant to acetylenic acid, if, instead of separating the mixture of alkyne isomers, the mixture as a whole is used as the starting material. Thus, whereas reactants containing 90% and more of heptyne-1, for example, may be converted to octynoic acid in yields of between 50% and 60% by successive reaction with sodium, carbon dioxide and an acidifying compound, the yield of acid may be increased to approximately 80% by using an alkyne mixture containing from 65% to 75% of heptyne-1 with the balance being made up primarily of heptyne-2. Improved yields are also obtained when, for example, the hexyne-1 reactant is admixed with alkynes such as butyne-2, pentyne-2, octyne-3, etc. which contain a different number of carbon atoms in the molecule than does the alkyne-1 reactant.

In carrying out the process of the invention, the alkali metal (which may be either sodium, potassium, lithium, cesium or rubidium, but is preferably sodium or potassium) is first dispersed in a liquid suitable for use as the reaction medium, such as octane, benzene, ligroin, or kerosene, though a wide variety of other relatively inert solvents, including aromatic and saturated or unsaturated aliphatic or alicyclic hydrocarbons, and mono-, di- or poly-ethers, could be used. To this alkali metal-containing liquid is then added the desired alkyne-1 reactant together with one or more hydrogen acceptor compounds, these alkyne additives being present either in the naturally occurring liquid state or dissolved in an appropriate solvent which may be the same as, or different from, the liquid employed to contain the alkali metal, and the ensuing reaction productive of alkali metal acetylide is then brought to completion. The improvement in yield of both the alkali metal acetylide and the final acetylenic acid product obtained as a result of the addition of alkyne-2 or other hydrogen acceptor compound is quite marked even when the amount of the latter material comprises about 10%, or even less, based on the total weight of alkyne-1 and hydrogen acceptor compound present. However, improved results are obtained when the hydrogen acceptor compound is present in the amount of at least 15%, with the amount of this additive profitably ranging upward to as much as 40 or 50% without harmful results and with a continued increase in yield of product as determined by the percentage of alkyne-1 reactant converted, these percentages again being based on the total weight of alkyne-1 and hydrogen acceptor compound present. It has also been found that addition of the alkyne-2 or other hydrogen acceptor compound materially reduces, and in many cases eliminates altogether, the charring which occurs in many instances in the absence of the hydrogen acceptor additive.

It also forms a feature of the present invention that still greater yields of acetylenic acid (based on the percentage of alkyne-1-reactant converted) may be obtained when the liquid employed as the reaction medium for the alkali metal and alkyne-1 reactants, as well as for the later reaction with carbon dioxide, contains not only a hydrogen acceptor, but also one or more sulfur or selenium compounds, though compounds of sulfur are preferred. Appropriate sulfur compounds are those such as sulfur dioxide, hydrogen sulfide, thiofene, and the like, many of which are either present as impurities in commercial grades of various solvents, particularly xylene, or are formed therein under the mild hydrogenation conditions prevailing in the system during reaction between the alkali metal and the alkyne-1 compound. Appropriate selenium compounds are hydrogen selenide, selenium oxide, and the like, which again may either be present in the solvent as initially composed or formed therein during the initial stages of the reaction. A significant improvement in yield of the desired acetylene derivative compound (the alkali metal acetylide or next higher acetylenic acid salt obtained by reaction with carbon dioxide) is obtained even when the solvent employed for the various reactants has a total sulfur (or selenium) content of about 0.05%, though preferably such content is from 0.1% to 0.5%.

In some cases, particularly when using the commercial grade of xylene, which contains approximately 0.16% total sulfur, excellent yields of acetylenic acid are obtained even when the alkyne-1 starting compound is not admixed with any alkyne-2 or other hydrogen acceptor, or with only a relatively small percentage thereof. However, the preferred practice, even when using a solution containing appropriate sulfur or selenium containing compounds, is to employ a mixture of alkyne homologues such as is indicated above in the case of heptyne-1, heptyne-2 mixtures.

Whatever the nature of the solvent employed, the alkali metal is dispersed therein in the desired manner, as by vigorous stirring while maintaining the liquid at a temperature of approximately 100° C. The mixture of alkyne homologues, or of alkyne-1 plus other hydrogen acceptor compound, is then added to the alkali metal containing liquid, after which the solution is preferably refluxed for a period of one or more hours to complete the reaction.

The following examples illustrate the manner in which the present invention finds embodiment.

Example I 5.75 parts of sodium were powdered by vigorously stirring under 200 parts by volume of boiling xylene (sodium dried, sulphur free) for 5 minutes. The temperature of the mixture was allowed to fall to 60° C. when 30.2 parts of a mixture of isomeric heptynes containing 75% by weight heptyne-1 and the balance substantially heptyne-2, were added over a period of 20 minutes with vigorous stirring. The temperature of the reaction mixture was raised to 100° C. and maintained at this temperature during 4 hours with continuous stirring.

The effect of varying the heptyne-1 concentration on the yield of octynoic acid can be seen from the following table, it being understood that the balance of the reactant heptyne is made up of heptyne-2.

| Concentration of heptyne-1 in reactant heptyne (percent by weight) | Yield of octynoic acid (percent of theory) |
| --- | --- |
| 97.6 | 59.2 |
| 75.0 | 71.2 |
| 69.5 | 77.9 |
| 53.5 | 80.3 |

Example II

Following the procedure detailed in the foregoing example, but using a heptyne mixture containing 70% by weight of heptyne-1, and the balance substantially heptyne-2, the yield of octynoic acid obtained was 78%. By replacing the sulfur free, sodium dried xylene with commercial xylene containing 0.16% total sulfur, the yield of octynoic acid obtained under the same conditions was 83.5% of theory.

Example III

Again following the procedure outlined in Example I, but using a heptyne mixture containing 97.6% by weight of heptyne-1 and as a reaction medium, a commercial grade of xylene containing 0.16% by weight total sulfur, the yield of octynoic acid obtained was slightly in excess of 80%. This compares with the yield of less than 60% obtained when using the same, though sulfur free, solvent and the 97.6% by weight heptyne-1 reactant, as indicated in Example I.

The invention claimed is:

1. The process comprising reacting an alkali metal with heptyne-1 in the presence of from 10% to 50% by weight of heptyne-2, based on the total weight of heptynes present, and in a commercial xylene solvent in which the resulting alkali metal acetylide is soluble, said solvent having a total sulfur content of from 0.05% to 0.5% by weight.

2. The process comprising reacting an alkali metal with an alkyne-1 hydrocarbon containing at least 3 carbon atoms in the molecule and having an active hydrogen atom on a terminal carbon atom forming a part of the acetylenic linkage, said reaction being conducted in the presence of from 10 to 50% by weight of an alkyne compound which is free of a terminal carbon atom forming a part of the acetylenic linkage (said percentage being based on the total weight of the alkyne-1 reactant and the last-mentioned alkyne compound) and in a liquid reaction medium in which the resulting alkali metal acetylide is soluble and which contains a total of from 0.05% to 0.5% by weight of at least one element of the group consisting of sulfur and selenium in the form of compounds of said elements.

PHILIP JAMES GARNER.
DENIS ARTHUR FIRTH.

REFERENCES CITED

The following references are of record in the file of this patent:

UNITED STATES PATENTS

| Number | Name | Date |
|---|---|---|
| 749,800 | Moureu | Jan. 19, 1904 |
| 2,228,752 | Carter | Jan. 14, 1941 |
| 2,413,254 | Soday | Dec. 24, 1946 |

FOREIGN PATENTS

| Number | Country | Date |
|---|---|---|
| 264,245 | Germany | Sept. 9, 1913 |

OTHER REFERENCES

Chemical Abstracts, vol. 36, p. 3783 (Abstracts from Sintezy Dushistykh Veshchesto, Sbonuk Statei), 1939, pp. 281–293.

The Chemistry of Petroleum Derivatives, by Ellis, vol. II, 1937, page 454.